United States Patent [19]

Morita

[11] Patent Number: 5,468,827
[45] Date of Patent: Nov. 21, 1995

[54] EPOXY-FUNCTIONAL MQ ORGANOPOLYSILOXANES

[75] Inventor: Yoshitsugu Morita, Chiba, Japan

[73] Assignee: Dow Corning Toray Silicon Co., Ltd., Tokyo, Japan

[21] Appl. No.: 259,817

[22] Filed: Jun. 15, 1994

[30] Foreign Application Priority Data

Jun. 29, 1993 [JP] Japan .................... 5-185627

[51] Int. Cl.$^6$ ........................... C08G 77/14; C08G 77/18
[52] U.S. Cl. ................................ 528/15; 528/27
[58] Field of Search .......................... 528/15, 27

[56] References Cited

U.S. PATENT DOCUMENTS

| | | | |
|---|---|---|---|
| 3,455,877 | 7/1969 | Plueddemann | 260/46.5 |
| 4,083,856 | 4/1978 | Mendocino | 528/27 |
| 4,666,745 | 5/1987 | Huhn et al. | 528/15 |
| 4,707,531 | 11/1987 | Shirahata | 528/12 |
| 4,946,921 | 8/1990 | Shirahata et al. | 528/39 |
| 5,079,311 | 1/1992 | Colas | 525/478 |
| 5,206,328 | 4/1993 | Okamura et al. | 528/27 |
| 5,283,309 | 5/1994 | Morita | 528/27 |
| 5,310,843 | 8/1994 | Morita | 528/15 |

FOREIGN PATENT DOCUMENTS

| | | |
|---|---|---|
| 345534 | 12/1989 | European Pat. Off. . |
| 473995 | 3/1992 | European Pat. Off. . |
| 541988 | 5/1993 | European Pat. Off. . |

Primary Examiner—Robert E. Sellers
Attorney, Agent, or Firm—Alexander Weitz

[57] ABSTRACT

An organopolysiloxane suitable for modifying curable organic and silicone compositions is disclosed, said organopolysiloxane having the general formula

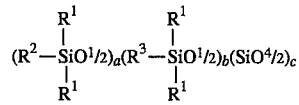

$$(R^2-SiO^{1/2})_a(R^3-SiO^{1/2})_b(SiO^{4/2})_c$$

with $R^1$ groups on the silicons wherein each $R^1$ is a monovalent group independently selected from the group consisting of hydrocarbon groups and halogenated hydrocarbon groups; $R^2$ is selected from the group consisting of the hydrogen atom, monovalent hydrocarbon groups and halogenated hydrocarbon groups; $R^3$ is selected from the group consisting of epoxy-functional organic groups, alkoxysilylalkyl groups and alkyl groups having at least 6 carbon atoms; a is zero or a positive number; b is a positive number; c is a positive number; a/c has a value of zero to <4; b/c has a value of 0.05 to 4; and (a+b)/c has a value of 0.2 to 4, with the proviso that neither $R^1$ nor $R^2$ is an alkenyl group and that said organopolysiloxane has in its molecule at least one said epoxy-functional organic group and at least one said alkyl group having at least 6 carbons.

14 Claims, No Drawings

EPOXY-FUNCTIONAL MQ ORGANOPOLYSILOXANES

FIELD OF THE INVENTION

The present invention relates to an organopolysiloxane and to a method for its preparation. More specifically, the present invention relates to an organopolysiloxane that is composed of the monofunctional siloxane unit (M unit) and tetrafunctional siloxane unit (Q unit) and that contains in each molecule at least 1 epoxy-functional organic group and at least 1 alkyl group having at least 6 carbons. The present invention also relates to a method for the preparation of this organopolysiloxane.

BACKGROUND OF THE INVENTION

Among the various types of organopolysiloxanes already known in the art, MQ organopolysiloxanes composed of monofunctional siloxane units (M units) and tetrafunctional siloxane units (Q units) (refer to Japanese Patent Application Laid Open Number Sho 61-195129 (U.S. Pat. No. 4,707,531) are used as starting material for varnishes and pressure-sensitive adhesives because of their heat resistance. More recently, hydroxyphenyl-containing MQ organopolysiloxane has been taught by Japanese Patent Application Laid Open Number Hei 1-292036 (U.S. Pat. No. 4,946,921) and chloromethyl-containing MQ organopolysiloxane has been taught by Japanese Patent Application Laid Open Number Hei 2-153935. The present inventor has also already proposed MQ organopolysiloxanes that contain epoxy-functional organic and alkoxysilylalkyl groups (Japanese Patent Application Laid Open Number Hei 5-105758 (U.S. Pat. No. 5,310,843)) and MQ organopolysiloxanes that contain epoxy-functional organic groups and diorganopolysiloxane residues (Japanese Patent Application Number Hei 3-331409 (U.S. Pat. No. 5,283,309)).

However, MQ organopolysiloxane in which epoxy-functional organic and $C_{\geq 6}$ alkyl groups are present on the monofunctional siloxane unit (M unit) silicon has heretofore been unknown.

SUMMARY OF THE INVENTION

The present invention takes as its object the introduction of organopolysiloxanes that are composed of monofunctional siloxane units (M units) and tetrafunctional siloxane units (Q units) and that contain in each molecule at least 1 epoxy-functional organic group and at least 1 alkyl group having at least 6 carbons. A further object of the present invention is the introduction of a method for the preparation of these organopolysiloxanes.

DETAILED DESCRIPTION OF THE INVENTION

The organopolysiloxane in accordance with the present invention has the general formula given below and contains in each molecule at least 1 epoxy-functional organic group and at least 1 alkyl group having at least 6 carbons

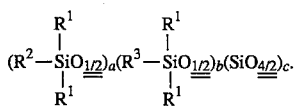

In the above formula $R^1$ is a monovalent hydrocarbon group, excluding alkenyl groups; R2 is the hydrogen atom, a monovalent hydrocarbon group, or a halogenated hydrocarbon group, excluding alkenyl groups; $R^3$ is a group selected from epoxy-functional organic groups, alkoxysilylalkyl groups, or $C_{\geq 6}$ alkyl groups; a is zero or a positive number; b is a positive number; c is a positive number; a/c has a value of zero to <4; b/c has a value of 0.05 to 4; and (a+b)/c has a value of 0.2 to 4).

The preparative method in accordance with the present invention comprises running an addition reaction in the presence of (A) a hydrosilylation-reaction catalyst among (B) an SiH-containing organopolysiloxane having the general formula

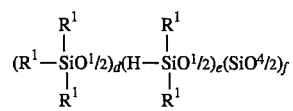

wherein $R^1$ is a monovalent hydrocarbon group or a halogenated hydrocarbon group, excluding alkenyl groups, d is zero or a positive number, e is a positive number, f is a positive number, d/f has a value of zero to <4, e/f has a value of 0.05 to 4, and (d+e)/f has a value of 0.2 to 4, (C) an aliphatically unsaturated epoxy-functional organic compound, (D) an alkene that contains at least 6 carbons, and, optionally, (E) an alkoxysilylalkene.

The organopolysiloxane in accordance with the present invention has the general formula given below and contains in each molecule at least 1 epoxy-functional organic group and at least 1 alkyl group having at least 6 carbons:

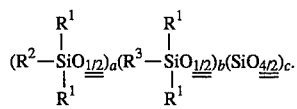

In the above formula, $R^1$ represents a monovalent hydrocarbon group, or a halogenated hydrocarbon group, exclusive of alkenyl groups. $R^1$ is specifically exemplified by lower alkyl groups such as methyl, ethyl, propyl, butyl; aryl groups such as phenyl, tolyl, xylyl; aralkyl groups such as benzyl, phenethyl; and haloalkyl groups such as chloromethyl, 3,3,3-trifluoropropyl. $R^2$ in the preceding general formula is the hydrogen atom, a monovalent hydrocarbon group, or a halogenated hydrocarbon group, exclusive of alkenyl groups. The monovalent hydrocarbon groups encompassed by $R^2$ are specifically exemplified by lower alkyl groups such as methyl, ethyl, propyl, butyl; aryl groups such as phenyl, tolyl, xylyl; aralkyl groups such as benzyl, phenethyl; and haloalkyl groups such as chloromethyl, 3,3,3-trifluoropropyl. $R^3$ in the preceding general formula is a group selected from epoxy-functional organic groups, alkoxysilylalkyl groups, or $C_{\geq 6}$ alkyl groups with the proviso that there is at least one epoxy-functional group and at least one $C_{\geq 6}$ alkyl group in each molecule. The epoxy-functional organic groups encompassed by $R^3$ are specifically exemplified by 2-glycidoxyethyl, 3-glycidoxypropyl, 4-glycidoxybutyl, 5-glycidoxypentyl, 2-(3,4-epoxycyclohexyl)ethyl, 3-(3,4-epoxycyclohexyl)propyl, and 4-(3,4-epoxycyclohexyl)butyl. The alkoxysilylalkyl groups encompassed by $R^3$ are specifically exemplified by trimethoxysilylethyl, trimethoxysilylpropyl, trimethoxysilylbutyl, trimethoxysilylpentyl, triethoxysilylethyl, triethoxysilylpropyl, triethoxysilylbutyl, methyldimethoxysilylethyl, methyldimethoxysilylpropyl, dimethylmethoxysilylethyl, and dimethylmethoxysilylpropyl. The $C_{\geq 6}$ alkyl groups encompassed by $R^3$ are specifically exemplified by hexyl, heptyl, octyl, nonyl, decyl, undecyl, dodecyl, tridecyl, tetradecyl, pentadecyl, hexadecyl, heptadecyl, and octadecyl. Preferred here are n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, and n-octadecyl. The alkyl group comprising $R^3$ in the organopolysiloxane of the present invention must contain at least 6 carbons, but the upper limit on the number of carbons is not specifically restricted. However, when the organopolysiloxane is to be blended into a curable organic resin, the preferred range for the number of carbons in the alkyl group comprising $R^3$ is 6 to 30 because this yields good compatibility with organic resins and good flexibility on the part of the final cured resin.

The subscript a in the preceding formula is zero or a positive number, and it represents the number of monofunctional siloxane units (M units) that do not contain $C_{\geq 6}$, epoxy-functional organic groups or alkoxysilylalkyl groups. The subscript b in the preceding formula is a positive number, and it represents the number of monofunctional siloxane units (M unit) that carry an epoxy-functional organic group or alkoxysilylalkyl group or $C_{\geq 6}$ alkyl group. The subscript c is a positive number that represents the number of tetrafunctional siloxane units (Q unit). The ratios among these subscripts are as follows: a/c=0 to less than 4, b/c=0.05 to 4, and (a+b)/c=0.2 to 4. The bases for these ratios are as follows: (i) no more than 4 M units can be present per Q unit; (ii) there must be present per Q unit at least 0.05 monofunctional siloxane units (M unit) that contain the epoxy-functional organic group or alkoxysilylalkyl group or $C_{\geq 6}$ alkyl group in order for the invention organopolysiloxane to exhibit good miscibility with and a good stress-relaxation activity on organic resins.

The organopolysiloxane of the present invention is a liquid or solid at room temperature. While its weight average molecular weight is not specifically restricted, this parameter preferably falls in the range of 500 to 500,000 because this affords good miscibility with organic resins.

The preparative method of the present invention will now be considered in greater detail.

The hydrosilylation-reaction catalyst comprising component (A) is a catalyst for the addition reaction of the silicon-bonded hydrogen atoms in component (B) across the aliphatically unsaturated bonds in components (C), (D), and (E). The hydrosilylation-reaction catalyst of component (A) comprises those compounds generally used as hydrosilylation-reaction catalysts, and no specific restrictions otherwise apply to this component. The hydrosilylation-reaction catalyst of component (A) is specifically exemplified by platinum, rhodium, and palladium compounds, but platinum compounds are preferred. Preferred platinum compounds are specifically exemplified by chloroplatinic acid, alcohol solutions of chloroplatinic acid, complexes between platinum and aliphatically unsaturated hydrocarbon compounds, platinum-vinylsiloxane complexes, platinum black, and platinum on active carbon. The addition of component (A) in the preparative method of the present invention is not specifically restricted as long as a catalytic quantity is added. When, for example, a platinum compound is used as component (A), it is preferably added in a quantity that provides 0.01 to 500 ppm as platinum metal atoms in component (A)

relative to the organopolysiloxane comprising component (B).

The SiH-containing organopolysiloxane comprising component (B) is the principal starting material in the preparative method of the present invention, and it is expressed by the following general formula.

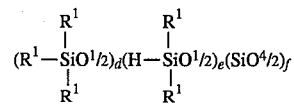

$R^1$ in the preceding formula represents a monovalent hydrocarbon group, or a halogenated hydrocarbon group, exclusive of alkenyl groups, and $R^1$ is specifically exemplified by lower alkyl groups such as methyl, ethyl, propyl, butyl; aryl groups such as phenyl, tolyl; aralkyl groups such as benzyl, phenethyl; and haloalkyl groups such as chloromethyl, 3,3,3-trifluoropropyl. The subscript d in the preceding formula is zero or a positive number, and it represents the number of monofunctional siloxane units (M unit) that do not carry silicon-bonded hydrogen. The subscript e is a positive number that represents the number of monofunctional siloxane units (M unit) that carry silicon-bonded hydrogen. The subscript f is a positive number that represents the number of tetrafunctional siloxane units (Q unit). The ratios among these subscripts are as follows: d/f=0 to <4, e/f=0.05 to 4, and (d+e)/f=0.2 to 4. The bases for these ratios are as follows: (i) no more than 4M units can be present per Q unit; (ii) there must be present per Q unit at least 0.05 SiH-containing monofunctional siloxane units (M unit) in order for the invention organopolysiloxane to exhibit good reactivity and good miscibility with organic resins.

Component (B) can be prepared by well-known methods. Preparative methods for component (B) are specifically exemplified as follows: (i) cohydrolysis of tetrahalosilane with monohalosilane, (ii) cohydrolysis of tetraalkoxysilane with monoalkoxysilane, and (iii) hydrolysis of tetraalkoxysilane and tetraorganodisiloxane followed by a re-equilibration polymerization reaction. The method in Japanese Patent Application Laid Open Number Sho 61-195129 is particularly preferred. This method consists of stirring organosilicon compound selected from hexaorganodisiloxane, tetraorganodisiloxane, triorganohalosilane, and diorganohalosilane in aqueous hydrochloric acid and dripping tetraalkoxysilane into this system.

The aliphatically unsaturated epoxy-functional organic compound comprising component (C) is the component that introduces the epoxy-functional organic group into the organopolysiloxane in accordance with the present invention. Component (C) in the invention preparative method is specifically exemplified by vinyl glycidyl ether, allyl glycidyl ether, butenyl glycidyl ether, pentenyl glycidyl ether, 1,2-epoxy-4-vinylcyclohexane, 1,2-epoxy-4-allylcyclohexane, and 1,2-epoxy-4-butenylcyclohexane.

The $C_{\geq 6}$ alkene comprising component (D) is the component that introduces the $C_{\geq 6}$ alkyl group into the organopolysiloxane in accordance with the present invention. The preparative method of the present invention requires that component (D) contain at least 6 carbons. While the upper limit on the number of carbons is not specifically restricted, component (D) preferably contains 6 to 30 carbons because this affords good reactivity with component (B) as well as a good miscibility between the final organopolysiloxane product and curable organic resins. The position of the carbon-carbon double bond in component (D) is also not specifically restricted, but the preferred position is the end of the molecular chain. Component (D) is specifically exemplified by hexene, heptene, octene, nonene, decene, undecene, dodecene, tridecene, tetradecene, pentadecene, hexadecene, heptadecene, and octadecene. Preferred as component (D) are 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, and 1-octadecene Neither the quantity of component (C) nor the quantity of component (D) is specifically restricted in the preparative method of the present invention. However, when the removal of unreacted component (D) is problematic, component (D) is then preferably added in a quantity that will provide less than 1 alkenyl group in component (D) per silicon-bonded hydrogen in component (B). The organopolysiloxane product in accordance with the present invention will contain silicon-bonded hydrogen plus epoxy-functional organic and $C_{\geq 6}$ alkyl groups when in the preparative method of the present invention components (C) and (D) together provide less than 1 aliphatically unsaturated bond per silicon-bonded hydrogen in component (B). When components (C) and (D) together provide $_{13}$ 1 aliphatically unsaturated bond per silicon-bonded hydrogen in component (B), an organopolysiloxane will be produced that contains epoxy-functional organic and $C_{\geq 6}$ alkyl groups but which is almost free of silicon-bonded hydrogen.

Component (E) is added on an optional basis in the preparative method in accordance with the present invention. The alkoxysilylalkene comprising component (E) is the component that introduces the alkoxysilylalkyl group into the invention organopolysiloxane. Component (E) is specifically exemplified by trimethoxyvinylsilane, trimethoxyallylsilane, trimethoxybutenylsilane, trimethoxypentenylsilane, triethoxyvinylsilane, triethoxyallylsilane, methyldimethoxyvinylsilane, methyldimethoxyallylsilane, methyldimethoxybutenylsilane, methyldiethoxyvinylsilane, methyldiethoxyallylsilane, dimethylmethoxyvinylsilane, dimethylmethoxyallylsilane, triethoxyvinylsilane, and methyldiethoxyvinylsilane.

Component (E) is added in freely selectable quantities in the preparative method of the present invention, and it is reacted, along with components (C) and (D), when the introduction of the alkoxysilylalkyl group into the invention organopolysiloxane becomes necessary. When component (E) is added in the preparative method of the present invention, the organopolysiloxane product in accordance with the present invention will contain silicon-bonded hydrogen plus epoxy-functional organic, alkoxysilylalkyl, and C6 alkyl groups when components (C), (D), and (E) together provide less than 1 aliphatically unsaturated bond per silicon-bonded hydrogen in component (B). When components (C), (D), and (E) together provide $_{13}$ 1 aliphatically unsaturated bond per silicon-bonded hydrogen in component (B), organopolysiloxane will be produced that contains epoxy-functional organic, alkoxysilylalkyl, and $C_{\geq 6}$ alkyl groups but which is almost free of silicon-bonded hydrogen.

The reaction sequence is freely selectable in the preparative method of the present invention. Specific examples of the reaction sequence are as follows: (i) components (A) and (B) are first mixed, components (C) and (D) are added to this system in order to synthesize organopolysiloxane that contains SiH plus epoxy-functional organic and $C_{\geq 6}$ alkyl groups, and component (E) is then added to the system in order to synthesize organopolysiloxane that contains epoxy-functional, alkoxysilylalkyl and $C_{\geq 6}$ alkyl groups; or (ii) components (A) and (B) are first mixed, component (E) is then added to this system in order to synthesize organopolysiloxane that contains SiH and alkoxysilylalkyl, and components (C) and (D) are subsequently added to the system in order to synthesize organopolysiloxane that contains epoxy-functional organic, alkoxysilylalkyl and $C_{\geq 6}$ alkyl groups.

The reaction temperature is not specifically restricted in the preparative method of the present invention, but reaction temperatures in the range of 50° C. to 150° C. are preferred in order to rapidly bring the addition reaction to completion. In addition, organic solvent can be used in the preparative method of the present invention. Organic solvents usable for the present invention are specifically but nonexhaustively exemplified by aromatic solvents such as toluene, xylene, and so forth; aliphatic solvents such as hexane, heptane, octane, and so forth; and ketone solvents such as acetone, methyl ethyl ketone, and so forth. The invention organopolysiloxane prepared as described above is obtained in the form of a reaction mixture, and it can be purified by distillation of unreacted component (C) or component (E) from the reaction mixture.

Since each molecule of the invention organopolysiloxane contains at least 1 epoxy-functional organic group and at least 1 $C_{\geq 6}$ alkyl group, this organopolysiloxane is useful as an internal stress-relaxing agent or internal release agent for curable resin compositions based on imide resin, phenolic resin, epoxy resin, and so forth, or for thermoplastic resins such as acrylic resin, polyethylene resin, and so forth. Moreover, the invention organopolysiloxane can be expected to improve the adhesion between curable resin compositions and metals and also to exhibit the activity of a surfactant with the $C_{\geq 6}$ alkyl group acting as hydrophobic group. When the invention organopolysiloxane contains in each molecule at least 1 epoxy-functional organic group, at least 1 alkoxysilylalkyl group, and at least 1 $C_{\geq 6}$ alkyl group, it is useful as an adhesion promoter for curable organic resin compositions and curable organopolysiloxane compositions.

EXAMPLE

The invention will be explained in greater detail below through working examples. The viscosity values reported in the examples were measured at 25° C., and the progress of the reactions in the examples was monitored by infrared spectrochemical analysis.

Example 1

Fifty weight parts of an organopolysiloxane with the average formula

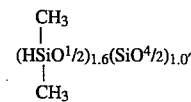

12.1 weight parts of 1-octadecene, and 83 weight parts of toluene were placed in a 1-liter four-neck flask equipped with a stirrer, reflux condenser, and thermometer. The moisture in the system was removed as the azeotrope by heating, and the system was then cooled under a nitrogen blanket. Ten drops of a 2 weight % isopropanolic chloroplatinic acid solution were dripped into the system from a syringe followed by stirring for 0.5 hours while heating at 100° C. and subsequently cooling to room temperature. Allyltrimethoxysilane (49.2 weight parts) was then dripped into the system followed by stirring the system for 1 hour while heating at 100° C., and 30.8 weight parts allyl glycidyl ether (dried over molecular sieve) was then added followed by heating for 2 hours at 110° C. The toluene and excess allyl glycidyl ether were removed by heating under reduced pressure (120° C./2 mmHg) to afford 120.9 weight parts product. This product was a transparent, light brown liquid with a viscosity of 200 centipoise. The characteristic absorption of the Si—H bond was almost completely absent from the product when the product was measured by infrared spectrochemical analysis. The gel permeation chromatogram of the product gave a weight-average molecular weight ($M_w$) of 2,200 (standard polystyrene basis) and a dispersity ($M_w/M_n$) of 1.12. The refractive index of the product was 1.4464. Structural analysis of the product by $^1$H-nuclear magnetic resonance spectroscopy (NMR), $^{13}$C-NMR, and $^{29}$Si-NMR confirmed it to be organopolysiloxane with the following average formula

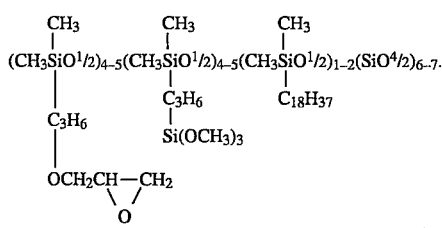

Example 2

One hundred weight parts of organopolysiloxane with the average formula

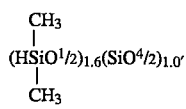

29.6 weight parts of 1-octadecene, 63.6 weight parts of vinyltrimethoxysilane, and 50 weight parts of toluene were placed in a 1-liter four-neck flask equipped with a stirrer, reflux condenser, and thermometer. The moisture in the system was removed as the azeotrope by heating, and the system was then cooled under a nitrogen blanket. Five drops of a 2 weight % isopropanolic chloroplatinic acid solution were dripped into the system from a syringe. The temperature was gradually raised by heating while stirring, and, after heating for 1 hour at 130° C., the system was cooled to room temperature. Allyl glycidyl ether (55.1 weight parts) (dried over molecular sieve) was then dripped into the system followed by heating for 1 hour at 120° C. The toluene and excess allyl glycidyl ether were removed by heating under reduced pressure (120° C./2 mmHg) to afford 235.0 weight parts of product. This product was a transparent, brown liquid with a viscosity of 108.5 centipoise. The characteristic absorption of the Si—H bond was observed to a very slight degree in the product when the product was measured by infrared spectrochemical analysis. The refractive index of the product was 1.4466. The gel permeation chromatogram of the product gave a weight-average molecular weight ($M_w$) of 2,050 (standard polystyrene basis) and a dispersity ($M_w/M_n$) of 1.11. When the structure of this product was analyzed by $^1$H-NMR, $^{13}$C-NMR, and $^{29}$Si-NMR, absorptions were observed that were similar to those for the organopolysiloxane synthesized in Example 1, and this product was confirmed to be organopolysiloxane with the following average formula that contained a small amount of Si—H bonds

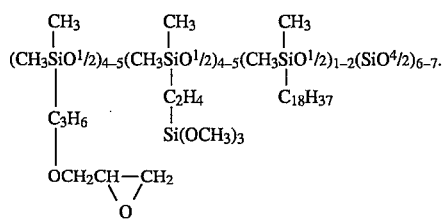

Example 3

One hundred weight parts organopolysiloxane with the average formula

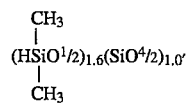

13.0 weight parts of 1-octene, and 49 weight parts of toluene were placed in a 500-mL four-neck flask equipped with a stirrer, reflux condenser, and thermometer. The moisture in the system was removed as the azeotrope by heating, and the system was then cooled under a nitrogen blanket. Five drops of a 2 weight % isopropanolic chloroplatinic acid solution were dripped into the system from a syringe followed by stirring for 0.5 hours while heating at 100° C. Then, while heating at 100° C. to 120° C., 64.2 weight parts of vinyltrimethoxysilane was dripped in over a period of 15 minutes followed by the dropwise addition of 56.5 weight parts allyl glycidyl ether (dried over molecular sieve). After heating the system for another 2 hours at 120° C., the toluene and excess allyl glycidyl ether were removed by heating under reduced pressure (120° C./2 mmHg) to afford 217.9 weight parts product. This product was a transparent, brown liquid with a viscosity of 15 centipoise. The characteristic absorption of the Si—H bond was observed to a very slight degree in the product when the product was measured by infrared spectrochemical analysis. The refractive index of the product was 1.4461. The gel permeation chromatogram of the product gave a weight-average molecular weight ($M_w$) of 1,850 (standard polystyrene basis) and a dispersity ($M_w/M_n$) of 1.09. Structural analysis of the product by $^1$H-NMR, $^{13}$C-NMR, and $^{29}$Si-NMR confirmed it to be organopolysiloxane with the following average formula that contained a small amount of Si—H bonds

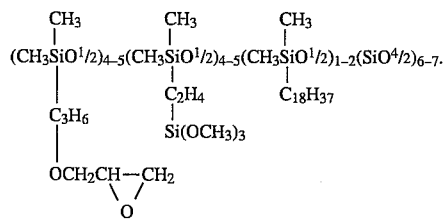

Example 4

One hundred weight parts organopolysiloxane with the average formula

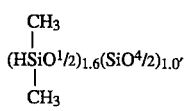

19.6 weight parts of 1-dodecene, and 49 weight parts of toluene were placed in a 500-mL four-neck flask equipped with a stirrer, reflux condenser, and thermometer. The moisture in the system was removed as the azeotrope by heating, and the system was then cooled under a nitrogen blanket. Five drops of 2 weight % isopropanolic chloroplatinic acid solution were dripped into the system from a syringe followed by stirring for 0.5 hours while heating at 100° C. Then, while heating at 100° C. to 120° C., 64.2 weight parts of vinyltrimethoxysilane was dripped in over a period of 15 minutes followed by the dropwise addition of 56.5 weight parts allyl glycidyl ether (dried over molecular sieve). After heating the system for another 2 hours at 120° C., the toluene and excess allyl glycidyl ether were removed by heating under reduced pressure (120° C./2 mmHg) to afford 226.4 weight parts product. This product was a transparent, brown liquid with a viscosity of 142.5 centipoise. The characteristic absorption of the Si—H bond was observed to a very slight degree in the product when the product was measured by infrared spectrochemical analysis. The refractive index of the product was 1.4475. The gel permeation chromatogram of the product gave a weight-average molecular weight ($M_w$) of 1,970 (standard polystyrene basis) and a dispersity ($M_w/M_n$) of 1.09. Structural analysis of the product by $^1$H-NMR, $^{13}$C-NMR, and $^{29}$Si-NMR confirmed it to be organopolysiloxane with the following average formula that contained a small amount of Si—H bonds

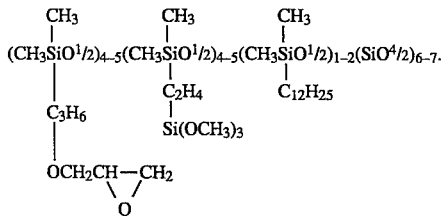

Example 5

One hundred weight parts of an organopolysiloxane with the average formula

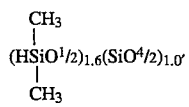

29.5 weight parts of 1-octadecene, 34.8 weight parts of allyl glycidyl ether, and 36.2 weight parts of toluene were placed in a 1-L four-neck flask equipped with a stirrer, reflux condenser, and thermometer. The moisture in the system was removed as the azeotrope by heating, and the system was then cooled under a nitrogen blanket. Five drops of a 2 weight % isopropanolic chloroplatinic acid solution were dripped into the system from a syringe followed by stirring for 1 hour while heating at 100° C. to 110° C. and subsequently cooling to room temperature. Allyl glycidyl ether (76.6 weight parts) (dried over molecular sieve) was then dripped into the system and the system was heated for another 21.5 hours at 110° C. to 120° C. The toluene and excess allyl glycidyl ether were subsequently removed by heating under reduced pressure (120° C./2 mmHg) to afford 222.1 weight parts product. This product was a transparent, brown liquid with a viscosity of 210 centipoise. The characteristic absorption of the Si—H bond was not observed in the product when the product was measured by infrared spectrochemical analysis. The refractive index of the product was 1.4569. The gel permeation chromatogram of the product gave a weight-average molecular weight ($M_w$) of 2,030 (standard polystyrene basis) and a dispersity ($M_w/M_n$) of 1.13. Structural analysis of the product by $^1$H-NMR, $^{13}$C-NMR, and $^{29}$Si-NMR confirmed it to be organopolysiloxane with the following average formula

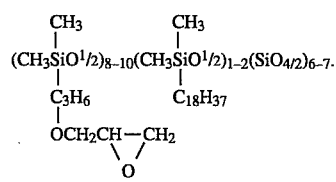

That which is claimed is:

1. An organopolysiloxane having the general formula

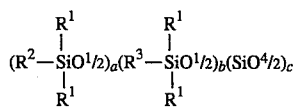

wherein each $R^1$ is a monovalent group independently selected from the group consisting of hydrocarbon groups and halogenated hydrocarbon groups; $R^2$ is selected from the group consisting of the hydrogen atom, monovalent hydrocarbon group and halogenated hydrocarbon groups; $R^3$ is selected from the group consisting of epoxy-functional organic groups, alkoxysilylalkyl groups and alkyl groups having at least 6 carbon atoms; a is zero or a positive number; b is a positive number; c is a positive number; a/c has a value of zero to <4; b/c has a value of 0.05 to 4; and (a+b)/c has a value of 0.2 to 4, with the proviso that neither $R^1$ nor $R^2$ is an alkenyl group and that said organopolysiloxane has in its molecule at least one said epoxy-functional organic group and at least one said alkyl group having at least 6 carbons.

2. The organopolysiloxane according to claim 1, wherein $R^1$ is selected from the group consisting of alkyl radicals having 1 to 4 carbon atoms, phenyl radical and 3,3,3-trifluoropropyl radical.

3. The organopolysiloxane according to claim 2, wherein $R^2$ is selected from the group consisting of the hydrogen atom, alkyl radicals having 1 to 4 carbon atoms, phenyl radical and 3,3,3-trifluoropropyl radical.

4. The organopolysiloxane according to claim 3, wherein said alkyl group having at least 6 carbon atoms is an alkyl group having 6 to 30 carbon atoms.

5. The organopolysiloxane according to claim 4, wherein said epoxy-functional group is selected from the group consisting of 2-glycidoxyethyl, 3-glycidoxypropyl, 4-glycidoxybutyl, 5-glycidoxypentyl, 2-(3,4-epoxycyclohexyl)ethyl, 3-(3,4-epoxycyclohexyl)propyl and 4-(3,4-epoxycyclohexyl)butyl and said alkoxysilylalkyl group is selected from the group consisting of trimethoxysilylethyl, trimethoxysilylpropyl, trimethoxysilylbutyl, trimethoxysilylpentyl, triethoxysilylethyl, triethoxysilylpropyl, triethoxysilylbutyl, methyldimethoxysilylethyl, methyldimethoxysilylpropyl, dimethylmethoxysilylethyl, and dimethylmethoxysilylpropyl.

6. The organopolysiloxane according to claim 5, wherein each $R^1$ is a methyl radical.

7. The organopolysiloxane according to claim 6, wherein $R^2$ is hydrogen.

8. The organopolysiloxane according to claim 6, wherein $R^2$ is methyl.

9. The organopolysiloxane according to claim 1, wherein a =0.

10. The organopolysiloxane according to claim 9, wherein $R^1$ is selected from the group consisting of alkyl radicals having 1 to 4 carbon atoms, phenyl radical and 3,3,3-trifluoropropyl radical.

11. The organopolysiloxane according to claim 10, wherein said alkyl group having at least 6 carbon atoms is an alkyl group having 6 to 30 carbon atoms.

12. The organopolysiloxane according to claim 11, wherein said epoxy-functional group is selected from the group consisting of 2-glycidoxyethyl, 3-glycidoxypropyl, 4-glycidoxybutyl, 5-glycidoxypentyl, 2-(3,4-epoxycyclohexyl)ethyl, 3-(3,4-epoxycyclohexyl)propyl and 4-(3,4-epoxycyclohexyl)butyl and said alkoxysilylalkyl group is selected from the group consisting of trimethoxysilylethyl, trimethoxysilylpropyl, trimethoxysilylbutyl, trimethoxysilylpentyl, triethoxysilylethyl, triethoxysilylpropyl, triethoxysilylbutyl, methyldimethoxysilylethyl, methyldimethoxysilylpropyl, dimethylmethoxysilylethyl, and dimethylmethoxysilylpropyl.

13. The organopolysiloxane according to claim 12, wherein each $R^1$ is a methyl radical.

14. The organopolysiloxane according to claim 9, wherein each $R^1$ is a methyl radical.

* * * * *